United States Patent [19]

Townsend et al.

[11] Patent Number: 5,183,433

[45] Date of Patent: Feb. 2, 1993

[54] SAUSAGE ENCASING MACHINE HAVING AN IMPROVED LOOPER HORN

[75] Inventors: Ray T. Townsend, Des Moines; Vincent L. Basile, II, West Des Moines, both of Iowa

[73] Assignee: Townsend Engineering Company, Des Moines, Iowa

[21] Appl. No.: 836,072

[22] Filed: Feb. 12, 1992

[51] Int. Cl.⁵ .............................................. A22C 11/00
[52] U.S. Cl. ........................................ 452/51; 452/46
[58] Field of Search ............................. 452/51, 48, 46

[56] References Cited

U.S. PATENT DOCUMENTS

| | | | |
|---|---|---|---|
| 3,790,685 | 2/1974 | Criss et al. | 452/51 |
| 3,964,129 | 6/1976 | Townsend | 452/51 |
| 4,233,709 | 11/1980 | Smith et al. | 452/51 |
| 4,880,105 | 11/1989 | Kasai et al. | 452/51 |
| 5,064,401 | 11/1991 | Kasai et al. | 452/51 |
| 5,092,813 | 3/1992 | Kasai et al. | 452/51 |

*Primary Examiner*—Willis Little
*Attorney, Agent, or Firm*—Zarley, McKee, Thomte, Voorhees & Sease

[57] ABSTRACT

A sausage encasing machine has an improved looper horn thereon mounted to be in communication with the horizontal flow path of encased linked sausages being discharged from the machine. The looper horn is mounted on a looper horn adapter which rotatably secures the horn for rotation with respect to the machine about a rotational axis that extends downwardly from the looper horn adapter. The looper horn is connected to a suitable source of rotational power. The geometry of the adapter and the looper horn causes the horn to be rotated from a substantially horizontal position of maximum elevation through a circular continuous arc which is located below the position of maximum elevation whereby the strand will never have to be moved in an upwardly inclined direction as it passes through the looper horn. The looper horn is U-shaped in cross section and thereupon has an elongated side opening having a discharge axis. The discharge axis is in a lateral direction when the looper horn is in its position of maximum elevation. The discharge axis then rotates downwardly as the looper horn moves downwardly on the continuous arc from the position of maximum elevation.

7 Claims, 3 Drawing Sheets

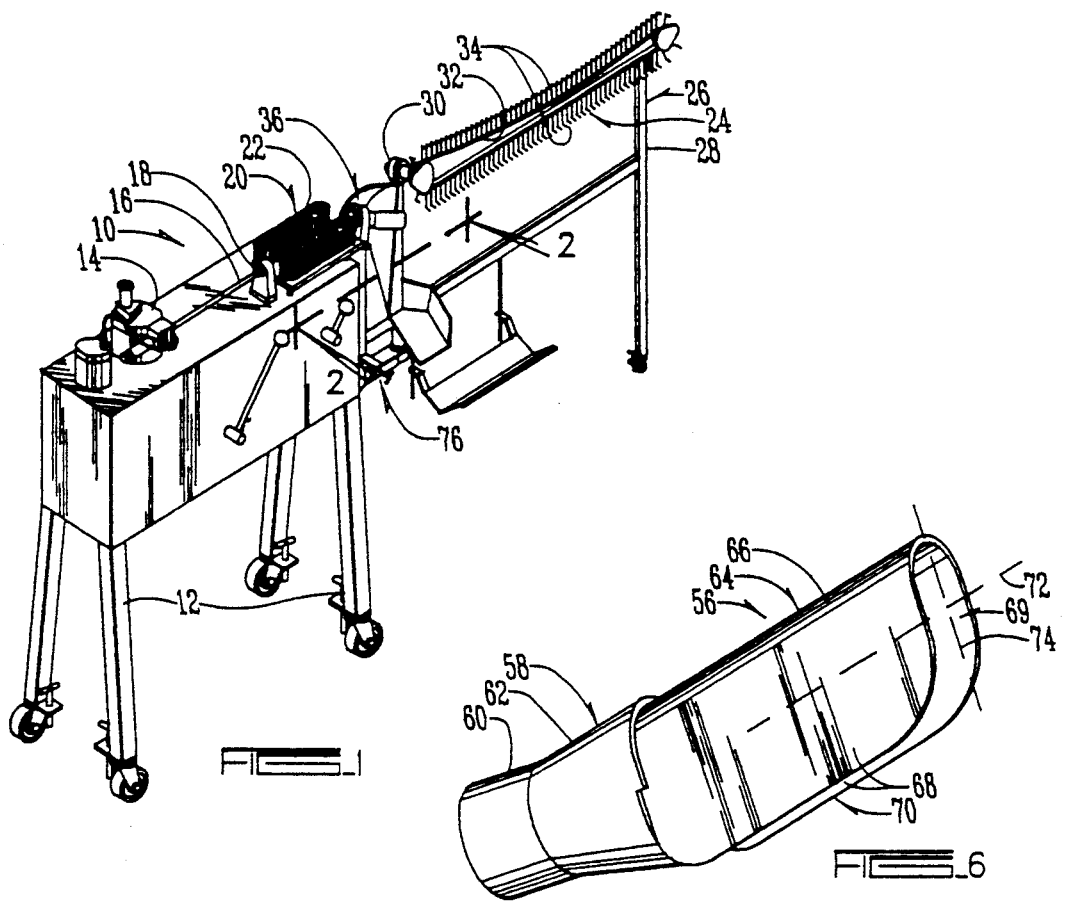
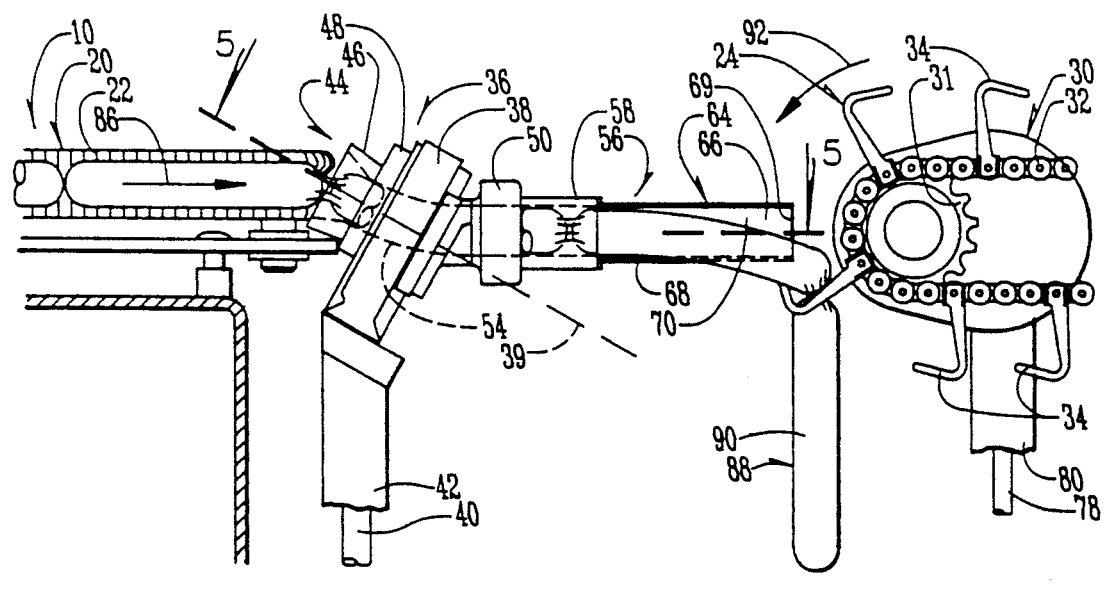

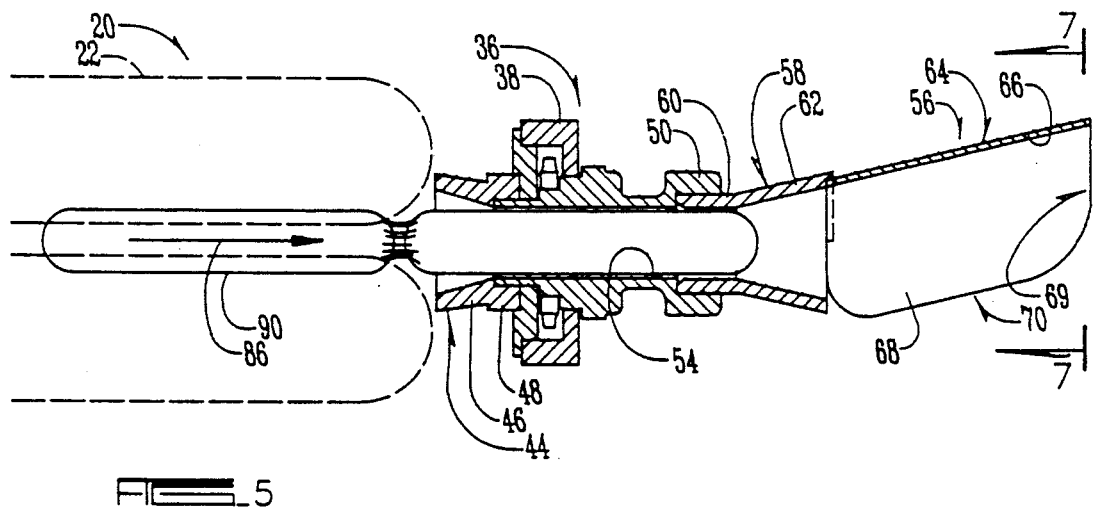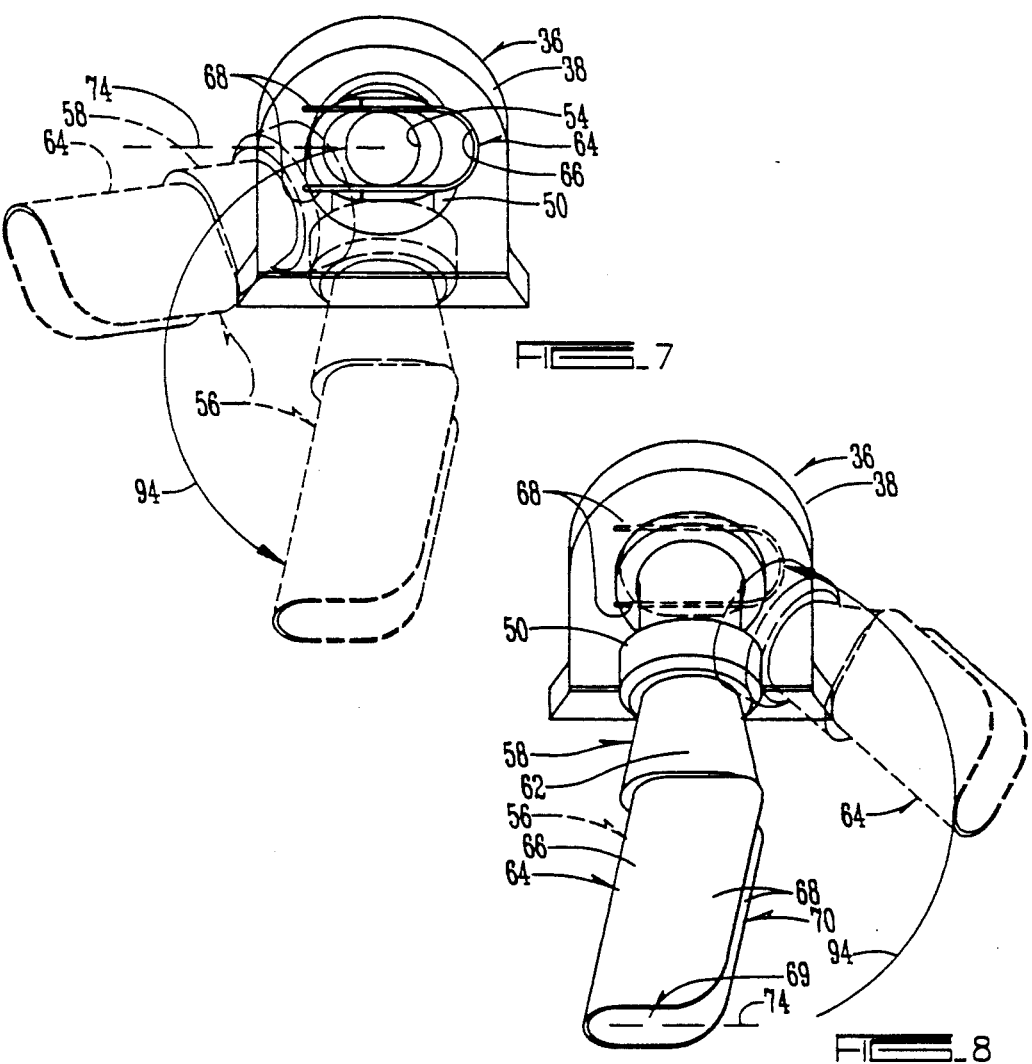

SAUSAGE ENCASING MACHINE HAVING AN IMPROVED LOOPER HORN

BACKGROUND OF THE INVENTION

Product encasing machines such as that disclosed in U.S. Pat. No. 3,191,222 can rapidly produce wieners or sausages at a rate of up to 30,000 encased units per hour. These machines fill an elongated casing with meat emulsion, create links in the filled casings, and discharge the strand of linked casings onto moving hooks of a conveyer such as that shown in FIGS. 19 and 20 of said U.S. Pat. No. 3,191,222. The deposit of the encased and linked product is effected by a looper horn located on the machine downstream from the conventional linking mechanism.

Prior art looper horns are disclosed in said U.S. Pat. No. 3,191,222, and others such as U.S. Pat. No. 3,694,853, where the looper horns comprise an enclosed tubular conduit eccentrically rotatably mounted on the discharge end of the machine, and which deposit loops of encased products on moving hooks of the conveyer as the looper horn rotates.

One of the shortcomings of existing looper horns is that their shape and eccentric mounting requires that the strand of encased product is forced to travel in an uphill direction through the horn at least during a portion of the rotational cycle of the horn. The friction created by this uphill travel slows down the movement of the strand, and causes it to back up in the linking chains for the linking means. This uphill problem also makes it virtually impossible to hang short sausages in a large loop.

A further problem of prior art looping horns is that the strand of encased sausages cannot escape quickly enough from the looping horns. This "bottle-necking" of the strand seeking to leave the looper horn also contributes to the strand backing up into the linking chains. This backing up phenomenon will momentarily stop the flow of sausages until the looper horn is in a position to continue filling the loop size. In short, the existing looper horns cannot always successfully loop the encased linked product on the conveyer at a speed equal to the speed by which the machine can generate the linked products. This is particularly true of longer sausages or wieners.

It is therefore a principal object of this invention to provide a sausage encasing machine with a looper horn wherein the looper horn will not ever require the strand of linked encased products to move in an upwardly inclined direction as the strand passes through the looper horn.

A further object of this invention is to provide a sausage encasing machine with a looper horn wherein the looper horn will be able to rapidly discharge the linked strand of encased product and successfully drape the strand on the hooks of a moving conveyer at a speed compatible with the speed by which the linked products are being generated.

A still further object of this invention is to provide a sausage encasing machine with a looper horn thereon that can equally accommodate linked product of varying lengths and diameters.

A still further object of this invention is to provide a sausage encasing machine which can create loops of encased linked products of uniform size.

These and other objects will be apparent to those skilled in the art.

SUMMARY OF THE INVENTION

The instant invention involves an improvement in a sausage encasing machine which has a means for creating an elongated strand of encased linked sausages along a substantially longitudinal and horizontal flow path. The improvement comprises a looper horn on the machine mounted to be in communication with the horizontal flow path of linked products to receive the products therein. A connecting element rotatably secures the looper horn for rotation with respect to the machine about a rotational axis that extends downwardly from said connecting element. This permits the looper horn to rotate from a substantially horizontal position of maximum elevation through a circular continuous arc which is located below the position of maximum elevation whereby the strand will never have to be moved in an upwardly inclined direction as it passes through the looper horn.

The looper horn is comprised of a U-shaped member which has an elongated side opening having a discharge axis. The looper horn is positioned with respect to the connecting elements so that the discharge axis of the side opening extends in a lateral direction when the looper horn is in its position of maximum elevation. The discharge axis then rotates downwardly as said loop horn moves downwardly on a continuous arc from the position of maximum elevation.

BRIEF DESCRIPTION OF THE DRAWINGS

FIG. 1 is a perspective view of a sausage encasing machine and a conveyer with the looper horn of this invention mounted thereon;

FIG. 2 is an enlarged scale elevational view taken on line 2—2 of FIG. 1;

FIG. 5 is a sectional view taken on line 5—5 of FIG. 2;

FIG. 6 is an enlarged scale perspective view of the looper horn of this invention;

FIG. 7 is an end elevational view of the looper horn taken on line 7—7 of FIG. 5; and FIG. 8 is a view similar to that of FIG. 7 but taken when the looper horn is in the position of FIG. 4.

DESCRIPTION OF THE PREFERRED EMBODIMENT

Figure 3:
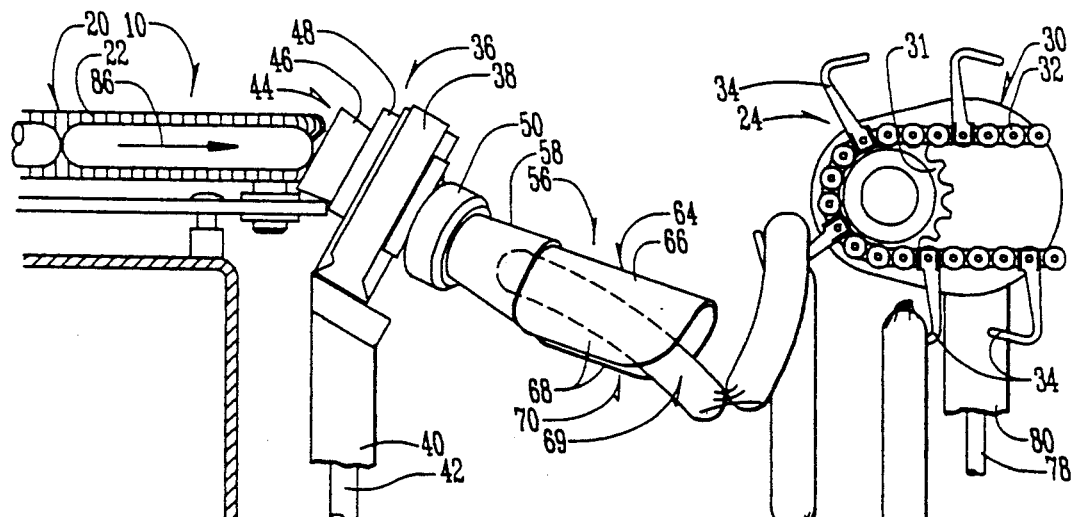
FIG. 3 is an enlarged scale elevational view also taken on line 2—2 of FIG. 1 but taken while the machine is in operation and the looper horn has just moved downwardly from its position of maximum elevation where sausages are being discharged through the side opening of the looper horn.

It should be understood that the term "sausage" as used herein means any encased product including wieners or the like.

The sausage encasing machine 10 has conventional downwardly extending legs 12, a meat emulsion pump 14 adapted to be connected to a source of meat emulsion (not shown); a conventional stuffing horn 16 that is in communication with the pump 14; a chuck mount 18 slidably receiving one end of the stuffing horn 16; and a linking mechanism 20 comprised of a pair of conventional linking chains 22. The foregoing structure is well known in the art as typically shown in U.S. Pat. No. 3,191,222.

As shown in FIG. 1, a conventional conveyer 24 having a frame 26 and a support leg 28 is secured to the discharge end of machine 10 in direct alignment with the horizontal channel existing between the chains 22. With reference to FIG. 2, gear boxes 30 are located at opposite ends of conveyer 24 and support offset sprockets 31 which in turn support conveyer chain 32. A plurality of spaced hooks 34 are secured to conveyer chain 32. This general structure is shown in the aforesaid U.S. Pat. No. 3,191,222 in FIGS. 5 and 6.

With reference to FIG. 2, a looper horn adapter 36 is secured to machine 10 immediately downstream from the linking mechanism 20. The adapter 36 has a gear housing 38 rotatably mounted therein with an axis of rotation 39 (FIG. 4) which extends downwardly from the horizontal channel of flow of product between the linking chains 22.

A vertically disposed power shaft 40 within shaft housing 42 extends upwardly towards the bottom of gear housing 38 and is connected to a convenient source of power (not shown).

Conduit assembly 44 is rotatably mounted within gear housing 38 and has an intake fitting 46 secured thereto adjacent the discharge end of linking mechanism 20. The conduit assembly further comprises a center section 48 which is secured to intake fitting 46. An adapter fitting 50 is similarly secured to center section 48 just opposite of intake fitting 46. Adapter fitting 50 has an enlarged diameter socket 52 on its downstream end. A downwardly curved conduit 54 extends through conduit assembly 44 as shown typically in FIG. 2.

A looper horn 56 (FIG. 6) has a funnel entry cone 58 comprised of a reduced diameter portion 60 which terminates in a flared section 62. A U-shaped trough portion 64 is secured to the outer end of funnel entry cone 58. Trough portion 64 is comprised of a rounded "bottom" 66, straight side walls 68, and a side discharge opening 70. The numeral 72 denotes the longitudinal axis of trough portion 64, and the numeral 74 designates the transverse discharge axis of the looper horn 56.

With reference to FIG. 1, a drive chain housing 76 interconnects the lower end of shaft 40 with the lower end of vertical drive shaft 78 which dwells within housing 80. It should be noted that the upper end of shaft 40 is operatively connected (not shown) to the center section 48 of conduit assembly 44 which exists within gear housing 38. The particular drive mechanism for the looper horn 56 is not critical to this invention and can assume a number of configurations such as that shown in FIGS. 8 and 9 of U.S. Pat. No. 3,694,853. For a typical drive train connection, see the aforesaid U.S. Pat. No. 3,191,222.

The drive shaft 78 extends upwardly into gear box 30 on conveyer 24. This arrangement is also shown in U.S. Pat. No. 3,191,222. It is important that the drive mechanism including shafts 40 and 78 interconnect the looper horn and the speed of rotation of conveyer chain 32 so that coordination will exist for looping the encased product on the hooks 34 secured to chain 32.

The numeral 86 identifies an arrow in FIG. 2 which defines the horizontal channel through which the stuffed linked sausages 88 flow between the linking chains 22. The numeral 90 designates a strand of elongated linked sausages. The arrow 92 in FIG. 2 designates the direction of rotation of the chain 32 and hooks 34. The arrows 94 in FIGS. 7 and 8 define a circular arc in which looper horn 56 rotates as will be described more fully hereafter.

It should be noted that the geometry of the looper horn adapter 36 and the looper horn 56, as shown in FIG. 2, requires that the looper horn 56 dwells in a horizontal position at its maximum elevational level. FIG. 12 illustrates the "12 o'clock" position of the looper horn as it is rotated about the axis of rotation 39 of the conduit assembly 44 in looper horn adapter 36. The gear housing 38 is tilted downwardly at an angle of approximately 30° with respect to a vertical plane.

As shown in FIGS. 7 and 8, the discharge axis 74 of the looper horn 56 is disposed in a horizontal position when the looper horn is at its maximum or highest elevation in the "12 o'clock" position. As the looper horn moves downwardly through arc 94 in a counterclockwise direction as viewed in FIG. 7, the strand of linked sausages 90 will fall outwardly from the looper horn as the discharge axis 74 is tilted downwardly. With reference to FIGS. 7 and 8, when the looper horn is in its "6 o'clock" position of rotation, the side discharge opening 70 thereof has completely reversed itself from the 12 o'clock position, and extends laterally outwardly toward the right as best seen in FIG. 8. As the looper horn then moves upwardly around the arc 94, the linked strand 90 is carried in the rounded "bottom" 66 of the looper horn and the strand is discharged through the open end 69 thereof (FIG. 8). The side discharge opening 70 permits the rapid discharge of the strand 90 from the looper horn and reduces any back pressure of the strand against the linking chains 22. Further, since the looper horn never is tilted in a direction so that the strand 90 has to move in an uphill direction, back pressure on the strand is avoided.

Figure 4:
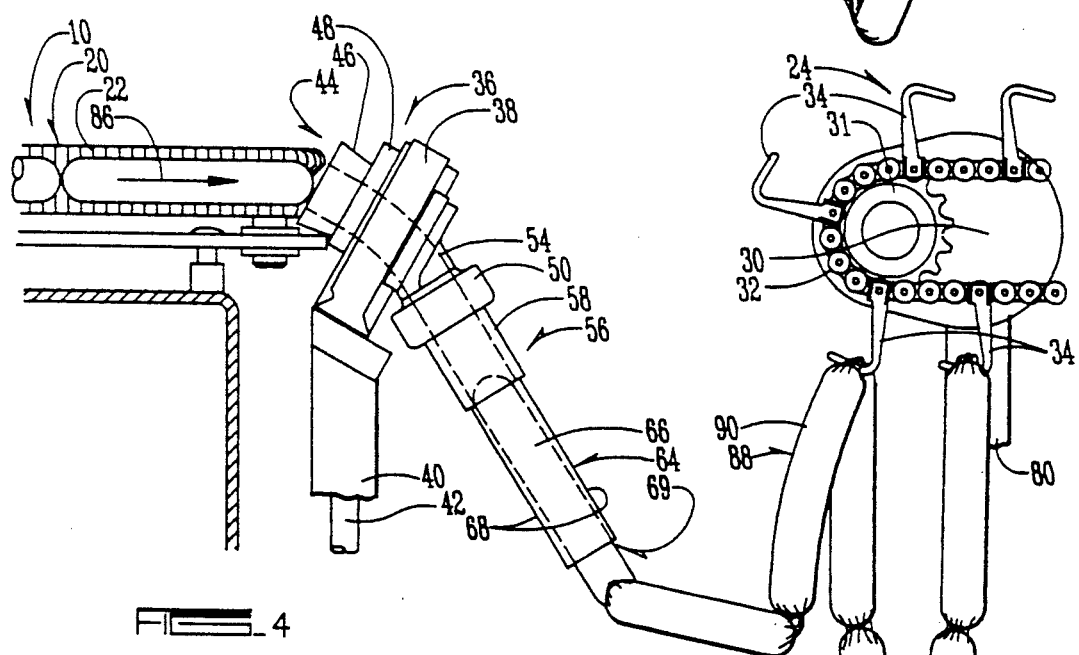
FIG. 4 is a view similar to that of FIG. 3 but shows the looper horn in its lower most position.

As the strand moves upwardly in a counterclockwise direction as shown in FIG. 7, a sausage link is laid over one of the hooks 34 at or about the time the looper horn reaches the 12 o'clock position (see FIG. 2). As the looper horn continues its downward rotation with respect to the 12 o'clock position, the strand continues to flow through the looper horn and rapidly discharges therefrom through the side discharge opening 70 as best shown in FIGS. 3 and 4. This results in loops 96 of substantially uniform size regardless of the lengths of the individual sausages 88.

From the foregoing, it is therefore seen that the device of this invention will achieve at least its stated objectives.

I claim:

1. An improvement in a sausage encasing machine comprising means for creating an elongated strand of encased linked sausages along a substantially longitudinal and horizontal flow path, the improvement comprising, a looper horn on said machine mounted to be in communication with said horizontal flow path to receive said strand, connecting means rotatably securing said looper horn for rotation with respect to said machine about a rotational axis that extends downwardly from said connecting means, whereby said looper horn will be rotated from a substantially horizontal position of maximum elevation through a circular continuous arc which is located below said position of maximum elevation whereby said strand will never have to be moved in an upwardly inclined direction as it passes through said looper horn.

2. The machine of claim 1 wherein said looper horn is U-shaped in cross-section and thereupon has an elongated side opening having a discharge axis, said looper horn being positioned with respect to said connecting means so that said discharge axis of said side opening extends in a lateral direction when said looper horn is in its position of maximum elevation, and then rotates downwardly as said looper horn moves downwardly on said continuous arc from said position of maximum elevation.

3. A looper horn for use with the discharge end of a sausage encasing machine, comprising, a looper horn body which is U-shaped in cross section and has an elongated side opening opposite to a bottom portion, opposite side walls, and an open end, to permit a strand of encased sausage links moving longitudinally therethrough to be discharged from said looper horn either through said open end or through said elongated side opening depending on the attitude of said looper horn.

4. The device of claim 3 in combination with the discharge end of a sausage encasing machine wherein a conveyer having a plurality of hooks on a movable chain is located adjacent the open end of said looper horn body, means rotating said looper horn body and said chain in coordinated condition so that a linked strand of sausages passing through said looper horn and out of said open end will engage one of said hooks, means for positioning said looper horn with respect to said machine so that said looper horn moves downwardly from a horizontal position of maximum elevation as said strand of sausage engages said hook.

5. The device of claim 4 wherein said elongated side openin has a transverse discharge axis that is disposed in a substantial horizontal position when said looper horn is in a position of maximum elevation.

6. The method of discharging and conveying an elongated strand of encased linked sausages from a sausage encasing machine utilizing a looper horn having an open discharge end, a side discharge opening, and a movable conveyor means having a plurality of supporting elements thereon, comprising, rotating said looper horn so that the open discharge end thereof moves through a circular path; said circular path having an uppermost twelve o'clock position, locating said conveyor means in close proximity to the open discharge end of said looper horn, passing an elongated strand of encased linked sausages through said looper horn for engagement with one of said support elements on said conveyor means when the discharge end of said looper horn is substantially at said twelve o'clock position in its circular path of rotation, causing said looper horn to be oriented immediately after said looper horn leaves said twelve o'clock position so that a portion of said strand of encased linked sausages will fall out of said side discharge opening ofs aid looper horn to relieve any back pressure on said strand of engaged linked sausages as said strand encounters said supporting element on said conveyor means.

7. The method of claim 6 wherein said looper horn is caused to assume a substantially horizontal position when reaching said twelve o'clock position.

* * * * *